United States Patent [19]

Gessner et al.

[11] 4,287,248
[45] Sep. 1, 1981

[54] BITUMINIZED ROOF SHEET

[75] Inventors: Wolfgang Gessner, Kelkheim; Helmut Kuhn, Königstein; Kurt Plötz, Waldems, all of Fed. Rep. of Germany

[73] Assignee: Hoechst Aktiengesellschaft, Frankfurt am Main, Fed. Rep. of Germany

[21] Appl. No.: 50,125

[22] Filed: Jun. 19, 1979

[30] Foreign Application Priority Data

Jun. 21, 1978 [DE] Fed. Rep. of Germany ....... 2827136

[51] Int. Cl.³ .......................... B32B 3/28; B32B 3/06
[52] U.S. Cl. .................................... 428/137; 156/85; 156/290; 428/152; 428/198; 428/300; 428/458; 428/489; 428/921
[58] Field of Search ............... 428/141, 137, 152, 920, 428/921, 458, 480, 198, 300, 489; 427/186, 316; 52/518; 156/85, 84, 290

[56] References Cited

U.S. PATENT DOCUMENTS

| 788,358 | 4/1905 | Jacobs | 428/921 |
| 1,551,318 | 8/1925 | Logan | 156/278 |
| 1,568,314 | 1/1926 | Buttress et al. | 428/141 |
| 1,665,222 | 4/1928 | Robinson | 427/186 |
| 1,970,746 | 8/1934 | Grayson et al. | 428/921 |
| 2,244,352 | 6/1941 | Young et al. | 428/152 |
| 3,137,972 | 6/1964 | Ekholm et al. | 50/243 |
| 3,967,032 | 6/1976 | Plotz et al. | 428/489 |

FOREIGN PATENT DOCUMENTS

| 1841101 | 9/1961 | Fed. Rep. of Germany . |
| 1949384 | 10/1966 | Fed. Rep. of Germany . |
| 2238637 | 2/1974 | Fed. Rep. of Germany ........... 428/300 |
| 750526 | 2/1933 | France . |
| 1205703 | 7/1962 | France . |
| 1433453 | 2/1966 | France . |
| 2015904 | 4/1970 | France . |
| 115056 | 6/1926 | Switzerland . |
| 1276295 | 6/1972 | United Kingdom ..................... 428/920 |
| 1326894 | 8/1973 | United Kingdom . |

OTHER PUBLICATIONS

Die Bauwirtschaft, "Wasserbau," Heft 44, Oct. 29, 1970.

Primary Examiner—Paul J. Thibodeau
Attorney, Agent, or Firm—Curtis, Morris & Safford

[57] ABSTRACT

The flame resistance of a bituminized roof sheet consisting of a reinforced fleece, a metal foil and bitumen is improved substantially by applying a metal foil to one face. A rupture of the metal foil in the case of stress due to elongation is prevented by wrinkling it. The elongation reserve thus obtained is in the range of from 2 to 35%.

21 Claims, 3 Drawing Figures

BITUMINIZED ROOF SHEET

The present invention relates to a bituminized roof sheet comprising a mechanically and/or thermally and/or adhesively reinforced fleece, a metal foil and bitumen and to a process for the manufacture thereof.

Composite structures of fleeces and metal foils are known. Generally they are prepared by laminating (bonding) a fleece and a foil. They are used as insulating material (heat reflection) or as steam barrier (cf. British Pat. Nos. 1,408,417; 1,215,137; German Offenlegungsschrift No. 24 23 211). For the purpose of heat reflection small metal spangles may be incorporated in the composite structures by conveying a metal foil sandwiched between two fleeces through a needle loom and bonding the metal foil and the fleeces by needling in such an intensive manner that the foil is crushed to provide spangles which are anchored in the fleece. Since the metal spangles are covered by the fleece on both faces, the textile touch of the resulting composite structure is maintained and when using composite materials of the above type as lining for clothes there is no danger of an abrasion of the metal due to wearing (cf. U.S. Pat. No. 3,145,713). Metal foils have moreover been bonded by needling between two textile layers for the purpose of manufacturing flame-resistant tufting carpets (cf. German Auslegeschrift No. 2,611,740).

However, composite materials of the above type are unsuitable for use as carrier material for the manufacture of bituminized roof sheets, since the dimensional stability of mechanically or thermally reinforced thermoplastic fleeces at the bituminization temperatures is too low. Longitudinal stress occuring at the high temperatures during bituminization would result in unacceptable shrinkage in width. Even fleeces that have been reinforced adhesively by means of a cross-linked, that is to say highly duromeric, plastic binder, suffer from elongation during bituminization, due to longitudinal stress on the apparatus, which may be compensated for, however, by cooling without stress. A bituminized roof sheet must be capable of undergoing elongations, when processed on the roof, in particular when applied onto areas of the roof that are difficult to coat and to seal, and moreover due to the fact that there is an "internal action" of the roof. When using a roof sheet having as carrier a composite material formed by a fleece and a metal foil, elongations necessarily result in breaking of the metal foil, if the "elongation reserve" of the metal foil is not sufficient (by the term "elongation reserve" there is to be understood that the metal foil is capable of undergoing elongation due to the fact that its surface is not flat, but structured).

It is the object of the present invention to provide a metal foil with an elongation reserve without impairing the technological properties of a fleece carrier (tensile strength, tear propagating strength, total penetration strength, high extensibility, relatively high proportion of elasticity (calculated on total elongation).

The invention avoids or at least clearly diminishes the only disadvantage of the roof sheets used hitherto, namely the disadvantage of melting away of the carrier when exposed to temperature above its melting point (260° C.). These temperatures may be reached by burning particles carried by the wind, when burning is not impaired sufficiently by adequate mineral additives and efficient mineral covering of the top bitumen layer of the roof. For example, when the polyester carrier of the roof sheet on a flat roof has melted away at one single position, the oxygen has free entrance to the lower sealing and insulating layers and burning of the latter can no longer be impaired sufficiently.

The excellent technological properties of polyester fleece carriers are maintained when these carriers are used in a composite material as disclosed in the present invention and thus further hard and lengthy research-work concerning bitumen compositions and bitumen coverings can be dispensed with.

The problems encountered hitherto are resolved by the present invention by providing a bituminized roof sheet consisting of a reinforced fleece, a metal foil and bitumen, wherein a metal foil has been applied at least onto one face of the fleece, which foil is wrinkled in at least one direction so as to provide an elongation reserve in at least one direction of from 2 to 35%, calculated on the length of the unenlongated state.

Suitable fleece materials are the known fleeces, that is, those made from staple fibers or filaments. Fleeces of synthetic fiber material such as polyamides, polyvinyl alcohol or polyesters are used preferably. Polyesters such as polyethylene terephthalate have proved particularly advantageous as fiber material for fleeces.

The fleeces are reinforced mechanically prior to being bituminized, for example with the use of a needle loom. Alternatively, they may be reinforced thermally according to any of the conventional methods, for example by heat bonding the fibers the surface of which has softened in the heat or by binding the fibers by means of a binder material. All reinforcing methods may be applied separately or one or several thereof may be combined with each other, according to the state of the art.

At least onto one face of the fleece reinforced in the above manner there is applied a metal foil which is wrinkled in one, two or in more directions so as to provide an elongation reserve in one, two or more directions of from 2 to 35%.

As metal foils any of the commercial foils made from copper, tin or aluminum may be used. Aluminum foils are used preferably because they are less expensive, although copper has some advantages because of its more favorable heat dissipation.

The wrinkles or the elongation reserve of the metal foil should be from 2 to 35%, calculated on the length of the bituminized roof sheet, preferably from 3 to 30%, in particular from 10 to 20%. Owing to these wrinkles, the metal foil does not rupture when the roof sheet undergoes elongations, if it did the roof sheet would lose its barrier action. On the contrary it is sufficiently extensible.

The metal foil advantageously is perforated additionally so as be gas-permeable to a certain degree during the condensation of the binder (in the case of an adhesive needle reinforcement).

Advantageously, both the metal foil and the fleece are provided with a perforation, by means of a needle loom or a needle perforation machine. This perforation, too, ensures a better penetration of the adhesive and the bitumen into the fleece and a gas permeability of the fleece and the metal sheet.

Usually the metal foil is wrinkled in many directions, according to a preferred embodiment, however, it is wrinkled only in one direction and over the whole width of the roof sheet. By wrinkling in this manner it is made sure that the roof sheet has an excellent extensibility in the longitudinal direction, where elongation is generally the most pronounced, whereas wrinkling in many directions in different lengths and heights gives multi-directional extensibility in all directions.

When the foil is wrinkled in many directions and when the wrinkles have greatly similar or even identical height and lengths, the roof sheet, too, exhibits a greatly similar or equal extensibility in all directions, without suffering from a rupture of the coherent aluminum foil and thus maintaining its flame-proofing property.

The roof sheets according to the invention can be manufactured according to various processes.

One method is to laminate a thermally and/or mechanically reinforced fleece with a metal foil that may be perforated, not perforated or be provided with stamps. Depending on the nature of the lamination, the adhesive reinforcement may be carried out prior to laminating or after laminating. Any kind of bonding agent may be used for the lamination. Bitumen may then be applied onto one face or onto both faces.

The stamps may have the form of grooves. They may run in longitudinal or transverse direction, relative to the direction of motion of the metal foil. The engraved grooves may moreover be straight or curved and they may run in all directions.

According to a preferred embodiment lamination and adhesive reinforcement are carried out in one step.

According to another embodiment of the inventive process the fleece, which is preferably made from polyester, exhibits a shrinkage in both directions of its surface, of from 2 to 35%, when exposed to hot air of 200° C., this shrinkage being effected after the combination of the metal foil with the fleece which occurs by needling or occasional bonding. During this process the metal foil becomes wrinkled automatically.

According to a preferred embodiment the metal foil and the fleece are provided separately with a needling or perforation by means of a needle loom or a needle perforation machine.

According to a still further embodiment the metal foil and the fleece are provided with a needling or perforation simultaneously by means of a needle loom or needle perforation machine.

Transverse grooves over the whole width of the foil are obtained suitably when passing the metal foil and the fleece through the needle loom or lamination machine with a defined overfeed of the metal foil.

The process of the invention is carried out particularly advantageously when using an aluminum foil as metal foil.

In particularly advantageous manner the wrinkles representing the elongation reserve are flattened prior to calendering.

The metal foil chosen should have a softening point and a melting point as high as possible to make sure that it remains intact if subjected to burning particles that are carried by the wind. Thus a spreading of the flames to the lower layers can be prevented. A flame spreading cannot be prevented when the layer that does not melt presents cracks and fissures due to elongation (caused by stress occuring during the bituminization process or during the "internal action" of the roof). Hence the elongation reserve of the high-melting layer is of decisive importance for a carrier material of a bituminized roof sheet. The danger of combustion of a roof provided with a bituminized roof sheet according to the invention and being tight for decades owing to the good properties of a polyester fleece carrier, is greatly reduced.

In the case of a thermally reinforced fleece, which undergoes nearly no more surface shrinkage, the elongation reserve may be attained when laminating this fleece with a metal foil structured by stamping in such a way that the required elongation reserve is ensured by the stamps obtained. Thus a metal foil with an elongation rate of from 1.5 to 2.7%, that may be used as well but is scarcely commercially available, need no longer be employed. The bonding agent may be applied onto the whole surface or pointwise, depending on the nature of the stamps of the metal foil. Wrinkling of the metal foil may be attained as well when feeding the metal foil to the laminating device with a defined overfeed. When using a bonding agent with volatile components, the metal foil is perforated suitably prior to being laminated, or the fleece plus the metal foil are perforated simultaneously prior to being laminated.

Perforation may alternatively be replaced by needling on the needle loom, using needles with or without beards. The metal foil and the fleece are suitably perforated or needled in particular when lamination is followed by adhesive reinforcement. Alternatively lamination and adhesive reinforcement may be carried out in one step. The binder used in this process may contain flame-retarding additives.

The criteria mentioned for thermally reinforced fleeces also apply to adhesively reinforced fleeces.

Mechanically reinforeced fleeces may be processed in analogous manner as the fleeces specified above. These fleeces generally undergo considerable surface shrinkage, which may contribute to considerable simplification and cost-saving of the process. When bonding the mechanically reinforced fleece and the metal foil by needling and when subjecting the composite structure formed, which is practically perforated and represents a solid bond between the fleece and the metal foil, to an adhesive reinforcement followed by drying and by condensation of the adhesive optionally containing flame-retarding additives, the metal foil is forced to form automatically small wrinkles in many directions so as to provide automatically an elongation reserve, due to the considerable shrinkage of the fleece at the high condensation temperatures. Needling results in a random multipoint reinforcement, preventing the formation of great, continuous wrinkles, which whould disturb a correct bituminization. In the inventive method the lamination may be carried out with a conventional needle loom whereas often a special device is required for attaining the same effect when this random multipoint reinforcement is to be achieved with use of an adhesive agent without needling. Consequently, the method specified hereinbefore is employed advantageously because of its simplicity. It cannot be employed, however, when the surface shrinkage of the reinforced fleece in hot air at 200° C. is below 2% and it is rendered difficult when the surface shrinkage is greater than 35%. The shrinkage in length and in width of the fleece may be equal or greatly differ from each other, depending on the manufacture of the fleece.

The thickness of the metal foil, too, is limited for reasons of costs and for technical reasons. The use of metal foils having a thickness of more than 150 μm results in a rapid wear of the needle beards and in a frequent fracture of the needles whereas metal foils having a thickness below 3 μm are in most cases susceptible to destruction during the rough needling process. However, the wrinkles formed are distributed the more homogeneously, the thinner the chosen metal foil. Consequently, the thickness of the metal foil also depends on the apparatus chosen. In the case of rather great mechanical stress, rather thick foils must be used. When the height of the wrinkles formed is so high that is may unfavorably act on bituminization, the composite structure may be flattened or be adapted to the desired thickness. Calendering the flattened material may result in a thinner composite structure, that makes it possible to manufacture a thinner roof sheet having equal technological properties equal to those of sheets obtained with the use of rather thick carriers that are very expensive. Calendering may also serve for pressing down the wrinkles that are too high owing to the fact that too low a number of bonding points between the fleece and the metal foil was chosen. Symmetrically arranged wrinkles that are too high may have a canalizing action on liquid and burning bitumen, thus increasing the running-off speed of the burning bitumen in the case of pitched roofs and accelerating fire propagation.

The applied bitumen may have been blown, or be modified by caoutchouc, by atactic polypropylene or other substances. It may contain flame-retarding substances. The bitumen layers on both faces of the composite structure need not have the same thickness.

The present invention will be illustrated, by way of example only, in the accompanying drawings and in the following examples.

Figure 1:
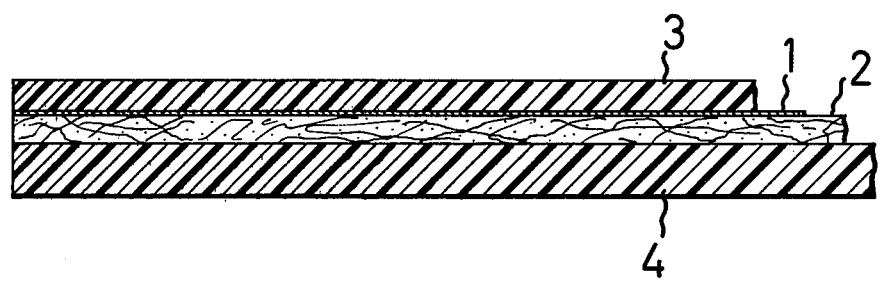
FIG. 1 is a sectional view of the roof sheet according to the invention. The sheet consists of the perforated or not perforated metal foil 1, the fleece 2 (which has been prepared from flame-resistant or normally burning fibers, preferably polyester fibers or filaments), and the bitumen layers 3 and 4. 5 are the wrinkles.
Figure 2:
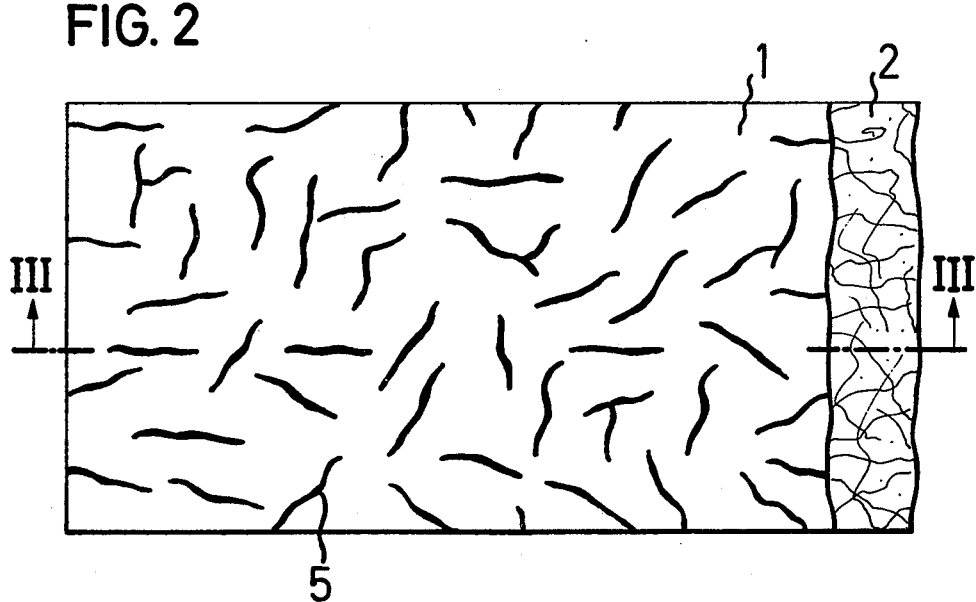
FIG. 2 is a top view of the wrinkled foil 1. Numeral 5 represents the wrinkles of the metal foil after shrinkage of the fleece 2 bonded therewith by needling or by pointwise adhesion.
Figure 3:
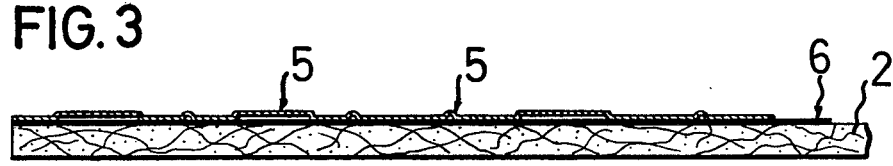
FIG. 3 is a sectional view along line III—III of the composite structure represented in FIG. 2, however without the bitumen layers. The composite structure consists of the fleece 2 and the metal foil 1, connected therewith pointwise or along certain lines by means of the adhesive layer 6, the wrinkles 5 having not yet been pressed against the fleece.

Two examples serve to illustrate the different behavior of composite structures provided with an elongation reserve or lacking such a reserve.

EXAMPLE 1

A fleece having a weight per unit area of 200 g/m$^2$, prepared from polyethylene terephthalate filaments with a shrinkage rate in hot air of 200° C. of 4% (determined after a 20 minutes' action of the hot air in a drying cabinet) and a filament titer of 4 dtex was connected by 50 punches/cm$^2$ on a needle loom with an aluminum foil 20 μm thick, the composite structure formed was impregnated with an acrylate binder (20% of solid bonding substance calculated on the initial weight of the fleece) and the binder was condensed at a temperature of 200° C. The elongation of the composite structure until rupture of the aluminum foil was on the average 13%. By bituminization on both faces of the composite structure there was obtained a roof sheet having the excellent properties as specified hereinbefore.

COMPARATIVE EXAMPLE

A composite structure was prepared in analogous manner as Example 1, except that the fleece was submitted to a hot air treatment prior to being needled. Remaining shrinkage in length and in width: 0.4%.

The elongation of this composite structure until rupture of the aluminum foil was on the average 1.5%.

A roof sheet prepared with the use of this carrier had cracks in the aluminum insert. Additional cracks occured during processing. The desired carrier action of the aluminum foil got lost, consequently.

Elongation of the test samples of the composite structure was effected by means of an Instron device (stepwise elongation of only 1%). During this test a source of light was placed behind the sample to that each punch and even the smallest crack became visible.

When removing bitumen that had been applied onto both faces of composite structures in a production plant for roof sheets, with the aid of perchloroethylene, there were obtained identical results as in Example 1 and as in the Comparative Example for the carrier of the composite structure.

The same applies to these roof sheets when processed on model roofs.

What is claimed is:

1. A process for the production of a roof sheet, including a fleece, metal foil and bitumen, which comprises attaching the metal foil to the fleece to obtain a composite structure, thereafter shrinking the fleece from 2 to 35 percent by exposing the attached fleece and foil to hot air, whereby the foil becomes wrinkled, and bituminizing at least one surface of the composite structure.

2. A roof sheet produced by the process defined in claim 1.

3. The process as defined in claim 1, which comprises attaching the metal foil to the fleece by needling.

4. A roof sheet produced by the process defined in claim 3.

5. The process as defined in claim 1, wherein the fleece is polyester.

6. A roof sheet produced by the process defined in claim 5.

7. The process as defined in claim 1, wherein the foil is perforated.

8. A roof sheet produced by the process defined in claim 7.

9. The process as defined in claim 1, wherein the metal foil is aluminum foil.

10. A roof sheet produced by the process defined in claim 9.

11. The process as defined in claim 1, which further comprises flattening the wrinkles prior to bituminization.

12. A roof sheet produced by the process defined in claim 11.

13. The process as defined in claim 1, which comprises bituminizing the surface of the composite structure including the metal foil.

14. A roof sheet produced by the process defined in claim 13.

15. The process as defined in claim 1, which comprises bituminizing both the surface of the composite structure including the metal foil and the reverse surface of the structure.

16. A roof sheet produced by the process defined in claim 15.

17. The process as defined in claim 1, wherein the fleece and foil are attached by adhesive at various points therebetween.

18. A roof sheet produced by the process defined in claim 17.

19. A process as defined in claim 1, wherein the metal foil is secured to the fleece by needling and shrinking of the fleece is effected at a temperature of 200° C.

20. A process as defined in claim 1, wherein the metal foil is secured to the fleece by adhesive at various points between the foil and fleece and shrinking of the fleece is effected at a temperature of 200° C.

21. A roof sheet produced by the process defined in claim 19 or 20.

* * * * *